Figure 1:
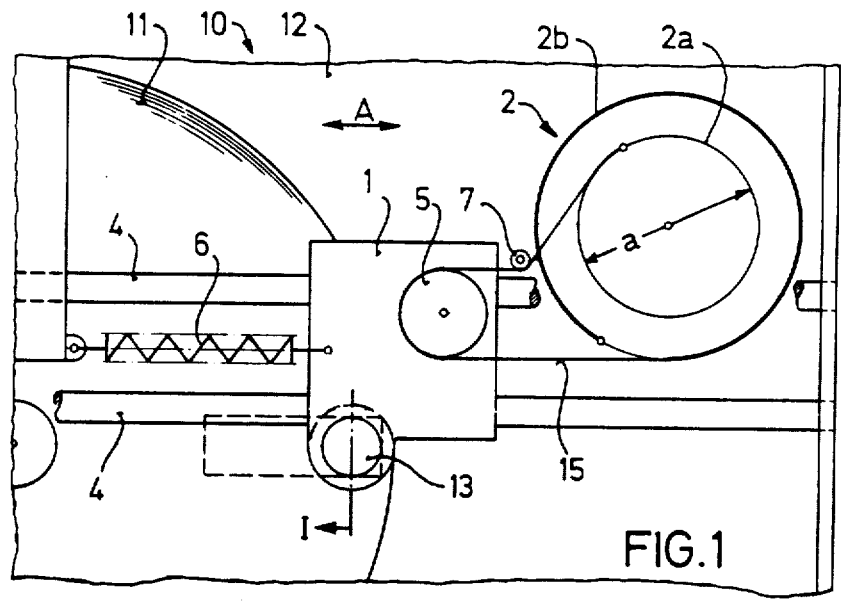

United States Patent [19]

Kohl et al.

[11] 4,310,865

[45] Jan. 12, 1982

[54] CABLE POSITIONER FOR A SCANNING HEAD

[75] Inventors: Lambert Kohl, Wachenheim; Udo Boehm; Klaus Schulze-Berge, both of Ludwigshafen, all of Fed. Rep. of Germany

[73] Assignee: BASF Aktiengesellschaft, Ludwigshafen, Fed. Rep. of Germany

[21] Appl. No.: 113,045

[22] Filed: Jan. 17, 1980

[30] Foreign Application Priority Data

Feb. 10, 1979 [DE] Fed. Rep. of Germany ....... 2905074

[51] Int. Cl.³ .......................................... G11B 21/08
[52] U.S. Cl. .................................................. 360/106
[58] Field of Search ................................. 360/106, 78

[56] References Cited

U.S. PATENT DOCUMENTS

| Re. 29,380 | 8/1977 | Castrodale et al. | 360/106 |
|---|---|---|---|
| 3,881,189 | 4/1975 | Mayeda | 360/106 |
| 3,946,439 | 3/1976 | Castrodale et al. | 360/106 |
| 4,161,004 | 7/1979 | Dalziel | 360/106 |
| 4,194,226 | 3/1980 | Kaseta et al. | 360/106 |

FOREIGN PATENT DOCUMENTS 2812981 10/1978 Fed. Rep. of Germany .

*Primary Examiner*—Robert S. Tupper
*Attorney, Agent, or Firm*—Keil & Witherspoon

[57] ABSTRACT

Positioner for the scanning head, mounted on a carriage, in a recording and/or playback apparatus for disk records, with a cable extending between the carriage and the drive motor, and a spring as counterforce, which positioner comprises a pulley, mounted on the carriage, and two pulleys of different diameter which are mounted on the shaft of the drive motor and to which the beginning and end of the cable are fixed, the pulley system operating on the differential pulley principle, so that greater accuracy of positioning is achieved and less torque has to be produced by the motor.

5 Claims, 6 Drawing Figures

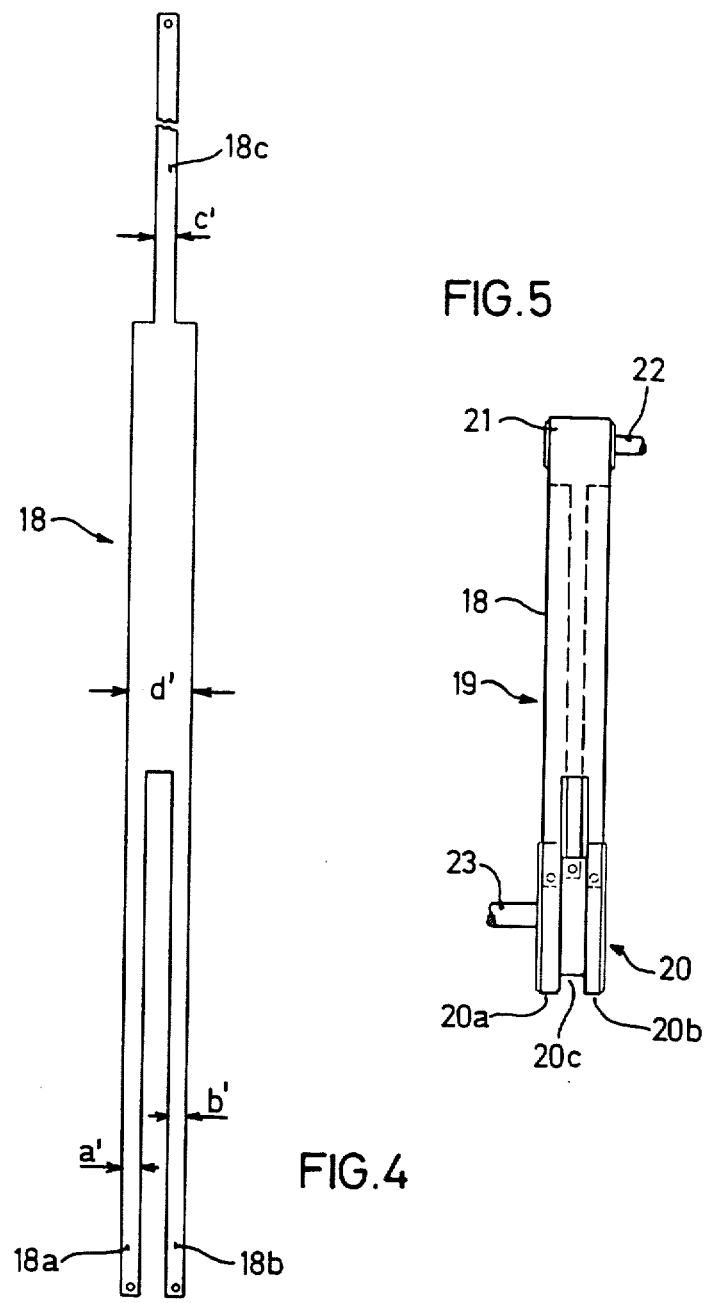

CABLE POSITIONER FOR A SCANNING HEAD

The present invention relates to a positioner for a scanning head in a recording and/or playback apparatus for disk records, particularly in a rigid or flexible magnetic disk drive, the scanning head being mounted on a carriage and a cable being provided between the carriage and a drive motor, the drive motor driving at least one pulley for winding and unwinding the cable and hence for effecting linear movement of the carriage bearing the scanning head.

U.S. Pat. No. Re. 29,380 discloses a positioning mechanism for a write and read head in a floppy disc drive unit, wherein an endless belt carries the head and travels over two pulleys which are at a distance from one another, one of the pulleys being driven by a stepping motor to effect stepwise linear movement of the head. This mechanism is expensive to manufacture and is insufficiently accurate.

U.S. Pat. No. 3,881,189 discloses another positioner, wherein a non-extensible strip is wound round a cylindrical body and secured thereto, whilst the ends of the strip are secured to points on the head carriage which are in spaced relationship to each other. One half of the strip is provided with a slot, and the other half consists of an elongated tongue, the width of which corresponds to the width of the slot, the tongue being doubled back through the slot to form a loop through which the cylindrical body is inserted.

In order to achieve the requisite high degree of positioning accuracy, each individual component must be precision-manufactured, and because the positioning mechanism does not run easily, a motor of relatively high power is needed.

It is an object of the present invention to provide a positioner which consists of simple components which can be quantity-produced economically, and which gives greater accuracy and speed of positioning than the conventional positioning systems.

We have found that this object is achieved, according to the invention, with a positioner for a scanning head in a recording and/or playback apparatus for disk records, particularly in a rigid or flexible magnetic disk drive, the scanning head being mounted on a carriage and a cable being provided between the carriage and a drive motor, the drive motor driving at least one pulley for winding and unwinding the cable and hence for effecting linear movement of the carriage bearing the scanning head, wherein the pulley is a stepped pulley, the difference in diameter of the pulley parts determining the precision with which the carriage is moved linearly.

The invention provides an inexpensive but precise and reliable device. From the manufacturing point of view, it is advantageous that one of the diameters of the pulleys, e.g. the larger one, can be selected as desired. In a further embodiment of the invention, the cable is advantageously in the form of a loop, of which one end is secured to the part of the pulley which has the smaller diameter, whilst the other end is secured to the part of larger diameter.

In yet another embodiment, a further cable with a spring is provided between the carriage and an additional pulley mounted on the same shaft as the stepped pulley, in order to produce constant tension in the loop of cable extending between the carriage and the stepped pulley. The spring which is under constant initial tension undergoes no change of length over the entire range of travel of the carriage, so that the requisite motor torque is the same in both directions of rotation. This increases head positioning accuracy and reduces the requisite motor power.

In another embodiment, the carriage is fastened to a tension spring, by which means tension in the loop of cable extending between the carriage and the stepped pulley can also be produced. Such a tension spring provided directly between the carriage and the apparatus chassis replaces the additional cable/pulley system.

In a further advantageous embodiment of the device according to the invention, the cable is in the form of a non-extensible strip which is forked at one end and has an elongated tongue at the other end, and the stepped pulley consists of two parts having the same diameter and of a third part having a different diameter, the two prongs being allotted to the two parts of the same diameter, and the elongated tongue being allotted to the third part of the pulley.

This does away with the need for the pulley on the carriage to be inclined, and simplifies the construction of the positioning device. However, a device for tensioning the strip is again necessary.

Figure 2:
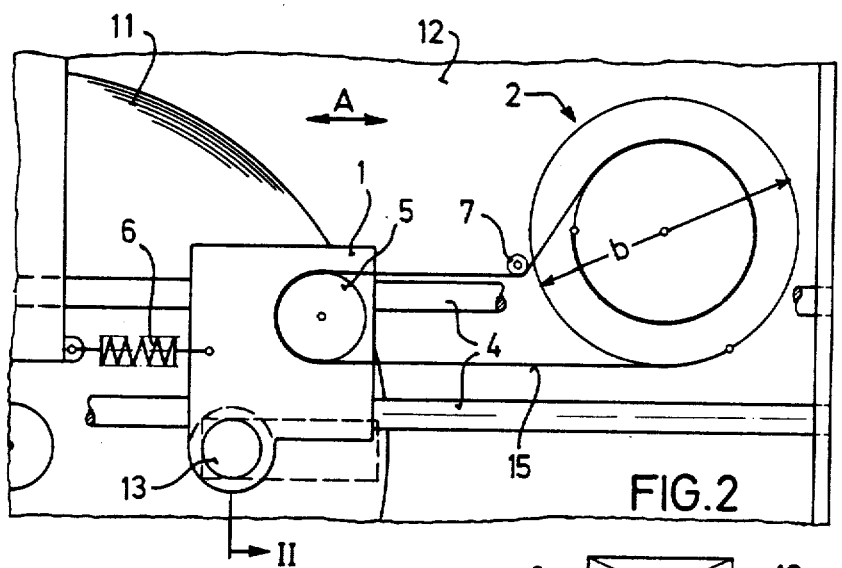
Figure 2A:
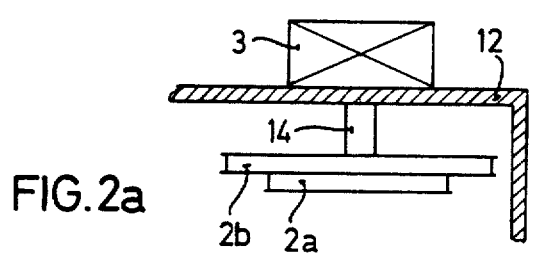
Figure 3A:
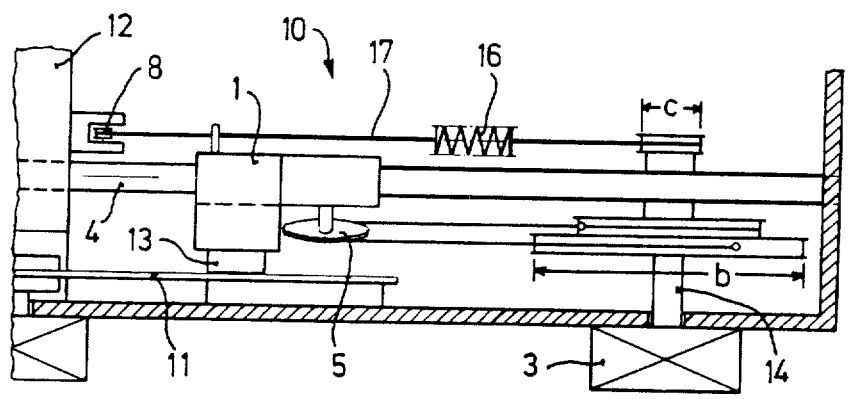
Figure 3B:
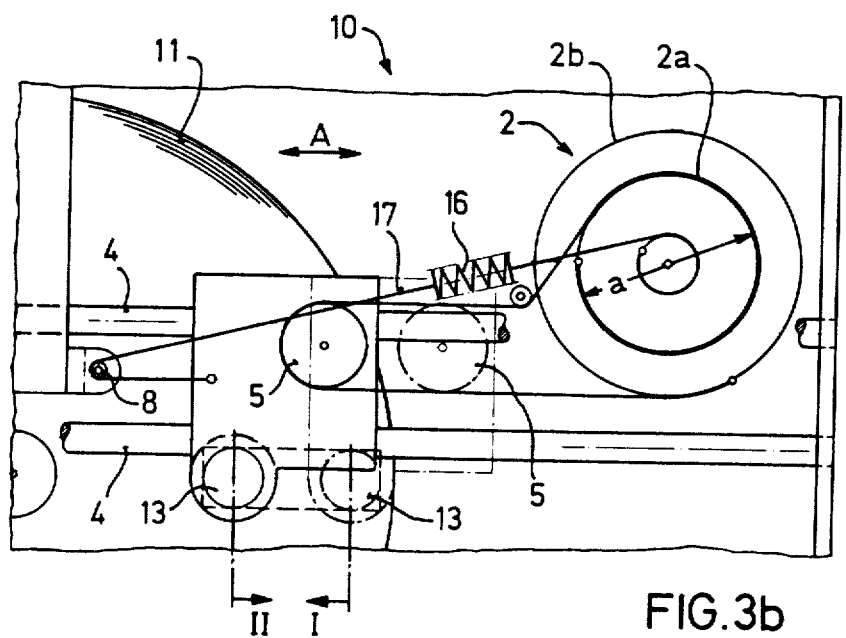

Further details of the invention are disclosed in the following description of the embodiments of the positioner illustrated in the accompanying drawings, in which FIG. 1 is a schematic plan view of a positioner according to the invention in a recording and/or playback apparatus for disk records, with a carriage mounted on the chassis, and a differential pulley, the scanning head being positioned over one of the outer tracks, FIG. 2 is a schematic plan view of the positioner of FIG. 1, with the scanning head over an inner track, FIG. 2a is a schematic side view, partly in section, of the stepped pulley forming part of the differential pulley, and a drive motor mounted on the chassis, FIG. 3a is a schematic side view, partly in section, of a further positioner with an additional cable/pulley system incorporating a tension spring, FIG. 3b is a schematic plan view of the positioner of FIG. 3a, FIG. 4 shows a strip which is forked at one end and has an elongated tongue at the other end, and FIG. 5 shows schematically the strip of FIG. 4 in position on the pulleys.

A unit 10 for driving a disk record 11 consists essentially of a chassis 12 and a positioner comprising a scanning head 13, for example a magnetic head, which is mounted on a carriage 1 that is slidably displaceable on guide rods 4 in the directions indicated by double arrow A. A drive motor 3, advantageously a stepping motor, moves the scanning head 13 from track to track on the disk record 11. The guide rods 4 and the motor 3 are fastened to the chassis 12 of the drive unit 10. A stepped pulley 2 is secured to the drive shaft 14 of the motor 3; the stepped pulley can of course be replaced by two separate fixed pulleys. The ratio of diameter a to diameter b depends on the desired or predetermined track spacing on the disk record 11 and on the stepping angle of the chosen motor 3. However, one of the two diameters, for example the larger diameter, can be selected freely, which is undoubtedly a great advantage in the manufacture of the positioning device. The loop of cable 15, which in FIGS. 1 to 3 consists, for example, of round wire made of suitable material, extends between a pulley 5 on the carriage 1 and the stepped pulley 2. One end of the cable 15 is secured to part 2b, having the larger diameter b, of the stepped pulley 2, and the other end to part 2a having the smaller diameter a. The cable ends are fastened to such points on the pulley peripheries that, when the stepped pulley 2 rotates in either direction, an adequate wraparound angle of cable on the pulley parts is guaranteed when the head 13 moves through its entire range of travel. The length of the cable depends on the particular construction chosen, and especially on the range of travel of the head 13. It is also necessary to ensure that during winding and unwinding the turns of cable do not engage one another in such a way as to impede the functioning of the device. A tension spring 6 is fastened between the carriage 1 and the chassis 12 of the unit 10 in FIGS. 1 and 2 and serves to keep the cable under constant tension. As the stepped pulley 2 is rotated by the motor 3, the total length of the loop of cable 15 is constantly shortened or lengthened as a result of the differing lengths of cable which are simultaneously wound and unwound. As a result, the carriage 1 changes its momentary position precisely step by step in accordance with the stepping angle of the motor 3 and with the selected ratio of diameter a to diameter b of the stepped pulley 2. Positioning of the head over the middle of the track can be effected very easily by moving a small guide pulley 7. The tension in the spring 6, which in FIG. 1 is shown in a more highly tensioned state and in FIG. 2 in a less tensioned state, causes the carriage 1 to occupy a position free from play, and to move without play in either direction. The spring tension must be sufficiently high to ensure this lack of play and to avoid slackness in the cable in every position of the head, since otherwise errors in positioning would occur.

Diameter b of the stepped pulley 2 is advantageously chosen in accordance with the space available inside the unit 10 since, as already mentioned, the diameter of one of the parts of the pulley can be selected at will, independently of the track spacing and of the stepping angle of the motor 3. It is furthermore advantageous to so choose the difference in diameter b-a and the stepping angle of the motor 3 that each step changes the position of the head by one track spacing.

In a further embodiment of the positioning device, a tension spring 16 as shown in FIGS. 3a and 3b is provided. In addition to the two parts of the pulley which have diameters a and b, a third pulley 2c, having a smaller diameter c than that of 2a or 2b, is provided on the motor shaft. The tension spring 16 is incorporated in the span of an additional cable 17, one end of which is secured to the periphery of pulley 2c, and the other end of which is fastened to the carriage 1. In addition to guide pulley 7, a guide pulley 8 is provided on the chassis 12. A further guide pulley, which is not shown, can also be mounted on the chassis 12 in order to ensure that the path of the cable 17 is parallel to the guide rods 4. The diameter c of pulley 2c is so selected that, when stepped pulley 2 rotates, the length of cable which is wound or unwound corresponds to the length of cable which travels past the guide pulley 8 on the chassis 12 during positioning of the carriage in one of the directions indicated by double arrow A. As a result, there is no change in the spring length over the entire range of travel of the carriage, so that the pull of the spring 16 remains constant. The pull, once it has been set, i.e. the initial tension, acts over the entire range of travel. Via the radius c/2 of pulley 2c, the pull creates a counter-torque to the torque of the motor 3, so that if the radius c/2 is suitably chosen, the positioner stays in its momentary position. As a result of the constant pull of the spring 16, the positioning torque to be produced by the motor 3 remains the same in both the positioning directions indicated by double arrow A, so that a cheaper type of motor, of lower power, can be used than if the torque requirement varies. Furthermore, as a result of the pull of the spring being the same in both directions, carriage movement is the same in both directions and consequently head positioning accuracy is increased.

In FIG. 3b, the position of the carriage when the head is in its outer position (I) is shown in broken lines, whilst for the inner position (II) of the head it is shown in solid lines. The two different positions of the pulley 5 are indicated similarly. As may be seen from FIG. 3a, the position of the pulley 5 is advantageously inclined to the horizontal by an amount corresponding to the distance between the center lines of the parts 2a and 2b of the stepped pulley 2. The same applies to the embodiments of the device shown in FIGS. 1 and 2.

FIG. 4 shows a strip 18, which has two prongs 18a and 18b at one end and an elongated tongue 18c at the other end, the sum of the widths $c' + a' + b'$ corresponding approximately to the width $d'$ of the strip.

FIG. 5 diagrammatically shows a drive system 19 including strip 18, the stepped pulley 20 consisting of the parts 20a and 20b, which are of the same diameter and allotted to the prongs 18a and 18b, and of the middle part 20c, which is allotted to the tongue 18c. The ends of the strip are suitably secured to the appropriate peripheries of the pulleys so that a loop is formed which passes around a roll 21 rotatably mounted, in a suitable manner, on the carriage 1, which is not shown in this Figure. Tension in the strip is produced, for example, by a spring acting on shaft 22. In this embodiment, the strip is symmetrical to the central plane of the stepped pulley, which is advantageous.

In addition to the advantages of the positioner of the invention which have already been mentioned, precise head positioning is achieved and frictional losses of the pulley system are minimal when the carriage is displaced. Thus, an error in the stepping angle of the motor 3 is halved as a result of the fact that equal errors affect the two parts 2a and 2b of the stepped pulley 2 or the three parts 20a, 20b and 20c of the stepped pulley 20, and this is to be regarded as a substantial advantage of the positioning device of the invention. Furthermore, it is advantageous if all parts of the stepped pulley 2 or 20 are produced with the same tool, in order to obtain the same tolerances (for example as regards surface finish).

In the case of a practical embodiment of a positioner of the invention (difference in diameter of pulley parts: 16.178 mm (b=46.000 mm, a=29.822 mm), motor stepping angle (with error): 7.5°±4%) employed in a conventional floppy disk drive having the following parameters:

Maximum number of tracks: 40

Track spacing: 0.529 mm, the following results were obtained:

Mean access time: 10 ms

Achievable head positioning accuracy with respect to track center: ±20/μm.

We claim:

1. A positioner for a scanning head in a recording and/or playback apparatus, comprising:

a chassis;

a carriage which carries the scanning head, said carriage being mounted for linear movement relative to said chassis;

pulley means including at least two coaxial pulley elements of different diameter, mounted for co-rotation on said chassis;

a cable the ends of which are attached to said two pulley elements, respectively, said carriage having a cable engaging element around which said cable is looped;

tensioning means attached to said carriage to produce a tension in the loop of said cable; and a motor for driving said pulley means so as to wind the cable on, and unwind the cable from, said two coaxial elements, respectively, and hence effect linear movement of said carriage and said head, the difference in diameter of the two pulley elements determining the precision of said linear movement.

2. A positioner as claimed in claim 1, wherein said pulley means is in the form of a stepped pulley.

3. A positioner as claimed in claim 1 or 2, wherein a tensioning spring.

4. A positioner as claimed in claim 3, wherein said spring is interposed in a further cable fastened at one end to said carriage, being run via a first associated pulley member carried by said chassis and being fastened at its other end to a second associated pulley member mounted for co-rotation with said pulley means in order to produce constant tension in the loop of said first-mentioned cable.

5. A positioner as claimed in claim 1, wherein the cable is in the form of a non-extensible strip which is forked at one end to form two prongs and has an elongated tongue at the other end, and wherein said pulley means includes two elements having the same diameter and a third element having a different diameter, the two prongs being attached to the two elements of the same diameter, and the elongated tongue being attached to the third element of the pulley means.

* * * * *